(12) United States Patent
Goldstein et al.

(10) Patent No.: US 7,324,196 B2
(45) Date of Patent: Jan. 29, 2008

(54) SPECTRAL ENCODER

(76) Inventors: Neil Goldstein, 15 Oakley Rd., Belmont, MA (US) 02478; Pajo Vujkovic-Cvijin, 1123 Arboretum Way, Burlington, MA (US) 01803; Marsha J. Fox, 11 Hilltop Ave., Lexington, MA (US) 02421; Steven M. Adler-Golden, 20 Clarendon St., Newtonville, MA (US) 02460; Jamine Lee, 19 Lisa St., Burlington, MA (US) 01803; Jason A. Cline, 80 Peach Orchard Rd., Burlington, MA (US) 01803; Brian Gregor, 114B Charlesbank Way, Waltham, MA (US) 02453

( * ) Notice: Subject to any disclaimer, the term of this patent is extended or adjusted under 35 U.S.C. 154(b) by 99 days.

(21) Appl. No.: 11/403,564

(22) Filed: Apr. 13, 2006

(65) Prior Publication Data

US 2007/0296969 A1    Dec. 27, 2007

(51) Int. Cl.
*G01J 3/28*    (2006.01)
(52) U.S. Cl. ...................................... 356/328
(58) Field of Classification Search ............ None
See application file for complete search history.

(56) References Cited

U.S. PATENT DOCUMENTS

| | | | |
|---|---|---|---|
| 5,504,575 A | 4/1996 | Stafford | |
| 5,535,047 A | 7/1996 | Hornbeck | |
| 5,815,261 A | 9/1998 | Brooks et al. | |
| 5,880,834 A | 3/1999 | Chrisp | |
| 5,923,036 A | 7/1999 | Tague et al. | |
| 6,046,808 A | 4/2000 | Fateley | |
| 6,100,974 A | 8/2000 | Reininger | |
| 6,504,943 B1 | 1/2003 | Sweatt et al. | |
| 6,624,874 B2 * | 9/2003 | Revelli et al. | 352/90 |
| 6,859,275 B2 | 2/2005 | Fateley et al. | |
| 6,870,619 B1 | 3/2005 | Tenhunen et al. | |
| 6,996,292 B1 | 2/2006 | Gentry et al. | |
| 7,248,358 B2 * | 7/2007 | Geshwind et al. | 356/310 |

OTHER PUBLICATIONS

MacKenty, J. W. and the NGST-MOS Study Team. "NGST-MOS A Multi-Object Spectrometer using Micro Mirror Arrays Final Report of the NGST-MOS Pre-Phase A Science Instrument Study of the NGST Project" Final Report NASA contract NAS5-98167 (1999).
Wehlburg, C.M., Wehlburg, J.C., Gentry, S.M., and Smith, J.L, "Optimization and characterization of an imaging Hadamard spectrometer," Proc. SPIE vol. 4381, pp. 506-515, Algorithms for Multispectral, Hyperspectral, and Ultraspectral Imagery VII, Sylvia S. Shen, Michael R. Descour, Eds., (2001).
Wuttig, A., and Riesenberg, R., "Sensitive Hadamard Transform Imaging Spectrometer with a simple MEMS," SPIE vol. 4881, (2002).

* cited by examiner

*Primary Examiner*—Tu T Nguyen
(74) *Attorney, Agent, or Firm*—Brian M. Dingman; Mirick, O'Connell, DeMallie & Lougee (57) ABSTRACT

A spectral encoder for producing spectrally selected images of a radiation field containing multiple spectral components. An imaging spectrograph defines a first optical path that produces from the input radiation field a spectrally dispersed image comprising multiple spectral components displaced along a dispersion direction. Spectral pass bands are encoded on the dispersed image by a programmable spatial light modulator using one or more spatial masks. The imaging spectrograph further defines a second optical path that reverses the spectral dispersion of the first path and produces a spectrally-encoded polychromatic output image containing only those spectral components encoded by the spatial mask. The first and second optical paths share a common dispersing element. A detector records at least one spatial region of the spectrally encoded output image.

48 Claims, 8 Drawing Sheets

SPECTRAL ENCODER

STATEMENT REGARDING FEDERALLY SPONSORED RESEARCH

This invention was made with government support under the following contracts: Fast Adaptive Spectrometer Programmable for the Evaluation of Combustion (FASPEC), Contract No. W31PQ-05-C-R095 (Army), Adaptive Spectral Imager (ASI) for the next generation EKV, Contract No. FA8718-04-C-0058 (MDA), Infrared Derivative Spectroscopy for Open Path Sensing, Contract No. W911SR-05-P-0063 (Army), and Chemical/Biological Agent Standoff Detection, Contract No. HDTRA1-05-P-0126 (DTRA). The government has certain rights in this invention.

FIELD OF THE INVENTION

This invention relates to a spectral encoder for recording polychromatic images with a programmable combination of spectral pass-bands. It can be used both to record spectrally filtered images and as a spectrometer to measure the spectrum of one or more spatial elements of a scene.

BACKGROUND OF THE INVENTION

Spectrally resolved images are widely used to identify features based on their spectral content. The most familiar approach is three-color imaging, which is used for visual identification. Hyperspectral imaging is an extension of color imaging, in which images are collected in a large number of contiguous spectral bands; it is widely used to detect features in an image based on spectral structure. Typically, a full spectrum is recorded for each spectral element in a two-dimensional scene to form a three-dimensional hypercube containing spatial and spectral information. The hypercube data is typically stored for later analysis and detection.

Spectral filtering has long been used to enhance specific features in an image. Most filtered spectral imagers employ a single, broad, band pass that enhances the features of interest. For example, hot combustion sources can be imaged using a band pass around 4.2 microns corresponding to hot carbon dioxide.

The current invention belongs to a class of devices that produce spectrally encoded images by first dispersing the light from a distant scene, encoding the light spectrally using a spatial mask that selects specific combinations of wavelengths, and then recombining the light on a detector that records the spectrally encoded polychromatic signal. Such devices often make use of a programmable spatial light modulator, such as a digital micromirror array, to create the spatial mask. The programmable modulator provides the ability to encode an arbitrary spectral pattern on each image element. The pattern can be used to generate a specific and highly complex spectral band pass on an image. Spectra can then be obtained by cycling the system through a sequence of spectral band passes.

It is known to use a sequence of spectral band passes to record spectra using Hadamard Transform spectroscopy. This approach uses a sequence of orthogonal spectral pass bands for spectral encoding, followed by decoding in a post-processing computer.

The use of digital micromirror devices for spatial encoding in spatial light modulator spectrometers is taught by Stafford (U.S. Pat. No. 5,504,575), and Fateley (U.S. Pat. No. 6,046,808). Both employ a single input element and a single output element, defined by either a fiber or a detector. Sweat et al. (U.S. Pat. No. 6,504,943) employ an input slit and linear array detectors to encode a spectral pass band on a one-dimensional image. This patent also teaches the use of spectral matched filters to identify objects in a scene.

Tague (U.S. Pat. No. 5,923,036), MacKentry (1999) [MacKentry, J. W. and the NGST-MOS Study Team. "NGST-MOS A Multi-Object Spectrometer using Micro Mirror Arrays Final Report of the NGST-MOS Pre-Phase A Science Instrument Study of the NGST Project" Final Report NASA contract NAS5-98167 (1999)], Gentry (U.S. Pat. No. 6,996,292), and Fateley (U.S. Pat. No. 6,859,275) teach methods of spatial-spectral imaging in which a spatial light modulator is used to define the input slit of a spectrograph, allowing either a single detector spectrograph or a one-dimensional imaging spectrograph to select different spatial elements of an input image for spectral analysis.

Fateley (U.S. Pat. No. 6,859,275) also teaches a wide variety of devices using spatial-spectral information processing. All use only a single pass through a dispersive element, and do not recombine the light to form a polychromatic image. All imaging devices are based on spectrally filtering an active source.

Hyperspectral Hadamard imaging spectrometers are known, for example as taught by Wuttig et al. 2002 (Wuttig, A., and Riesenberg, R., "Sensitive Hadamard Transform Imaging Spectrometer with a simple MEMS," SPIE vol. 4881, (2002)), Wehlburg et al. 2001 (Wehlburg, C. M., Wehlburg, J. C., Gentry, S. M., and Smith, J. L, "Optimization and characterization of an imaging Hadamard spectrometer," Proc. SPIE Vol. 4381, p. 506-515, Algorithms for Multispectral, Hyperspectral, and Ultraspectral Imagery VII, Sylvia S. Shen, Michael R. Descour, Eds., (2001)), and Gentry et al. (U.S. Pat. No. 6,996,292). These devices produce full two-dimensional images using a two-dimensional array detector. The input image is passed though two spectrographs, one to disperse the image, and one to recombine the spatially encoded image onto the two-dimensional detector array. The spectral bandpass of each pixel is defined by the spatial mask overlaying the dispersed image and the detector elements. The use of the detector elements, rather than a separate entrance slit to define the bandpass differentiates these devices from other SLM spectrometers, such as Tenhunen (U.S. Pat. No. 6,870,619) and Brooks (U.S. Pat. No. 5,815,261).

Some spectrographs have a curved convex grating dispersive device. Many hyperspectral imagers, such as those taught by Chrisp (U.S. Pat. No. 5,880,834) and Reininger (U.S. Pat. No. 6,100,974) have used a single spectrograph, along with a slit and a two dimensional array detector, to produce a hyperspectral imager with one dimension of spatial resolution and one dimension of spectral resolution. Most such hyperspectral imagers use the traditional lateral Offner configuration, in which the input and output beam are displaced from the center of curvature, and light is dispersed along the displacement axis. This results in good imaging performance along the length of the slit, which is positioned perpendicular to the dispersion axis. The imaging performance is poor however along the dispersion direction, making this approach difficult for two-dimensional imaging applications.

Wuttig et al. 2002, Wehlburg et al. 2001, and Gentry et al. (U.S. Pat. No. 6,996,292) apply two such lateral Offner spectrographs to disperse and recombine a two-dimensional image. The spectrographs are highly modified from the original Offner configuration in order to improve image quality along the dispersion direction.

SUMMARY OF THE INVENTION

The current invention stems in part from the realization that overall image quality in a spectral encoder is improved by placing the dispersed image close to the center of curvature along the dispersion axis. One implementation of the invention uses the so-called vertical Offner orientation, in which light is dispersed in a direction perpendicular to the displacement direction. This keeps the dispersed image close to the center of curvature in the dispersion dimension, thereby reducing image aberrations, which grow non-linearly with displacement from the center of curvature. With this configuration, a single spectrograph, using only one grating and one other optical element with a curved surface to both disperse and recombine the image, can produce a high quality two-dimensional image. By contrast, the lateral Offner configuration requires two distinct gratings and four additional curved optical surfaces to produce similar image quality.

This invention is not restricted to the Offner configuration. Other concentric spectrograph designs can be used and even a single-element concave grating may be used, provided the images are close to the center of curvature along the dispersion direction. The invention is also not restricted to application for Hadamard Transform Spectroscopy, but can also be used with alternative spectral encoding approaches, including imaging with complex band-pass filters.

This invention also stems from the realization that the signal to noise ratio of spectral imagers and spectrographs can be improved by maximizing the total light collected per unit area of detector. The double pass spectrograph design increases the total light collection by recombining all the wavelengths of the input light onto a single detector element. For many applications, including most applications in the infrared at wavelengths greater than 3 microns, the system noise is limited by the size of the detector element. The double pass spectrograph of this invention accomplishes an efficient optical design that minimizes the image spot size. This design can make use of small detectors, therefore increasing the signal to noise ratio. Furthermore, light collection is optimized by omitting the slit in the spectrograph, and instead using the detector element in conjunction with the spectral mask to define the spectral pass bands of the system.

This invention features a spectral encoder producing spectrally selected images of a radiation field containing multiple spectral components, comprising an imaging spectrograph that defines a first optical path that produces from the input radiation field a spectrally dispersed image comprising multiple spectral components displaced along a dispersion direction, means, comprising a programmable spatial light modulator, for encoding spectral pass bands on the dispersed image using one or more spatial masks, the imaging spectrograph further defining a second optical path that reverses the spectral dispersion of the first path and produces a spectrally-encoded polychromatic output image containing spectral components as encoded by the spatial mask, wherein the first and second optical paths share a common dispersing element, and a detector that records at least one spatial region of the spectrally encoded output image.

The spatial light modulator may be programmable and may comprise a two-dimensional digital micromirror array. The dispersing element may be a curved grating, and in the first optical path the dispersed image may be placed near to center of curvature of the grating along the dispersion direction, to reduce image aberrations. The imaging spectrograph in the first optical path may place the dispersed image near the aplanatic focus along the dispersion direction, to reduce image aberrations.

The spectrograph may comprise a near-concentric optical system defined by a curved grating and at least one additional curved refractive or reflective element, in which the input image, dispersed image, and the center of curvature of both the grating and the refractive or reflective element are nearly coplanar. The near-concentric optical system may comprise a convex and near-spherical grating, and at least one concave and near-spherical mirror with a radius of curvature approximately twice that of the grating. The input image may be offset from the center of curvature of the grating in a direction perpendicular to the dispersion direction by a distance that is greater than the displacement along the dispersion direction. The center of curvature of the convex grating and concave mirror may be displaced from one another by a small distance to correct image aberrations.

The detector may be a two-dimensional array detector, a one-dimensional array detector or a single element detector. The spatial light modulator may be used to encode spatial as well as spectral information within the image. The combination of the detector and the spatial masks may define the spectral pass bands of the imager. A collection of images each with a different instantaneous set of spectral pass bands may be detected and processed to develop spectra of spatially resolved elements of the image.

The means for encoding spectral pass bands on the dispersed image may further comprise a spectral template containing multiple spectral pass bands. The multiple spectral pass bands of the spectral template may be designed to identify a spectral feature, or combinations of spectral features, that are characteristic of a specific object, liquid, gas, or scene condition. An image may be generated of the radiation that conforms to the specific spectral template within the field of view. The spectral encoder may further comprise a hardware implementation of a projection operator for determining the contribution to the observed spectrum of one member of an orthogonal set of spectral templates representing known spectral signatures or linear combinations of known spectral signatures.

A collection of images with different specific spectral templates may be generated and processed to detect, identify, or quantify specific objects, liquids, gases, or scene conditions. The spectral encoder may in this case further comprise a hardware implementation of a matched filter, for accomplishing the generation and processing of the collection of images, and may still further comprise a hardware implementation of an orthogonal set of spectral templates representing known spectral signatures or linear combinations of known spectral signatures, for accomplishing the generation and processing of the collection of images.

Featured in another embodiment is a spectral encoder for producing spectrally selected images of a radiation field containing multiple spectral components, comprising a first spectrograph means that forms a dispersed image comprising multiple spectral components displaced along a dispersion direction, means, comprising a programmable spatial light modulator, for encoding spectral pass bands on the dispersed image, means for redirecting the dispersed image through a second spectrograph means to recombine the selected spectral components into a spectrally encoded two-dimensional image, a detector that records at least one spatially resolved element of the spectrally encoded image, wherein each spectrograph means comprises a near-concentric optical system defined by a convex dispersive element and at least one concave mirror, wherein the input image, dispersed image, and the center of curvature of the curved optical surfaces are nearly coplanar, and the light path through the spectrograph means originates in the object plane, proceeds along a first path to a first location on the concave mirror, along a second path to the convex dispersive element, along a third path to a second location on the concave mirror, and along a fourth path back to the image plane, and wherein the dispersive element is oriented so that the dispersed images are placed near the dispersive element center of curvature along the dispersion direction, and substantially offset from the dispersive element center of curvature in the direction perpendicular to the dispersion direction.

The programmable spatial light modulator may comprise a digital micromirror array. The first and second spectrograph means may comprise a single spectrograph with a common convex dispersive element. The spectral encoder may comprise two separate concave mirrors, one at the first location and one at the second location. The detector may be an array detector with multiple elements, or a single element detector. The spatial light modulator may be used to distinguish different spatial regions within the image.

The means for encoding may further comprise a spatial mask which in conjunction with the detector elements, or an optional input slit, defines a specific spectral template with defined spectral components. A collection of images with different spectral templates may be detected and processed to develop spectra of at least one spatially resolved elements of the image. The specific template may be designed to emphasize a spectral feature or combinations of spectral features characteristic of a specific object, liquid, gas, or scene condition. The spectral encoder may further comprise a hardware implementation of a projection operator for determining the contribution to the observed spectrum of one member of an orthogonal set of spectral templates representing known spectral signatures or linear combinations of known spectral signatures.

A collection of images with different specific spectral templates may be generated and processed to detect, identify, or quantify specific objects, liquids, gases, or scene conditions. The spectral encoder may further comprise a hardware implementation of a matched filter, for accomplishing the generation and processing of the collection of images. The spectral encoder may further comprise a hardware implementation of an orthogonal set of spectral templates representing known spectral signatures or linear combinations of known spectral signatures, for accomplishing the generation and processing of the collection of images.

Also featured in the invention is a spectral encoder for producing spectrally processed images of a radiation field containing multiple spectral components, comprising a first spectrograph means that forms a dispersed image comprising multiple spectral components displaced along a dispersion direction, means for encoding selected spectral pass bands on the dispersed image using a spatial mask, means for redirecting the dispersed image through a second spectrograph means to recombine the selected spectral components into a spectrally encoded two-dimensional image, a detector comprising one or more detector elements that record spatially resolved elements of the image, and wherein each detector element defines a virtual slit, that in combination with the spatial mask defines a specific template of spectral pass bands designed to emphasize a spectral feature or combinations of spectral features characteristic of an object, liquid, gas, or scene condition.

The means for encoding may comprise a programmable spatial light modulator. The spatial light modulator may be used to encode spatial information within the image. The detector may be a two-dimensional array detector, a one-dimensional array detector or a single element detector. The spatial light modulator may be used to encode spatial information within the image. A template of spectral pass bands may be designed to emphasize a spectral feature or combination of spectral features characteristic of an object, liquid, gas, or scene condition.

Spectra of at least one spatially resolved elements within the image may be developed by detecting and processing a sequence of images, each with a different template of specific spectral pass bands. A collection of images with different templates may be generated and processed to detect, identify, or quantify objects, liquids, gases, or scene conditions. The spectral encoder may further comprise a hardware implementation of a matched filter, for accomplishing the generation and processing of the collection of images. The spectral encoder may further comprise a hardware implementation of an orthogonal set of spectral templates representing known spectral signatures or linear combinations of known spectral signatures, for accomplishing the generation and processing of the collection of images. The spectral encoder may further comprise a hardware implementation of a projection operator for determining the contribution to the observed spectrum of one member of an orthogonal set of spectral templates representing known spectral signatures or linear combinations of known spectral signatures.

BRIEF DESCRIPTION OF THE DRAWINGS

Other objects, features and advantages will occur to those skilled in the art from the following description of the preferred embodiments of the invention, and the accompanying drawings, in which.

DESCRIPTION OF THE PREFERRED EMBODIMENTS

The preferred embodiment of the spectral encoder of this invention consists of a double-pass spectrograph with an intermediate encoding mask, and a detector. External means, such as foreoptics or optical fibers, are used to introduce a radiation field to the object plane of the spectrograph. The spectral encoder produces a spectrally encoded image of the object field on the detector. Using telescope foreoptics, the imager might investigate a distant scene, or using microscope foreoptics it might investigate a microscopic scene. Alternatively, using optical fibers it might measure radiation from multiple distant locations.

Figure 1:
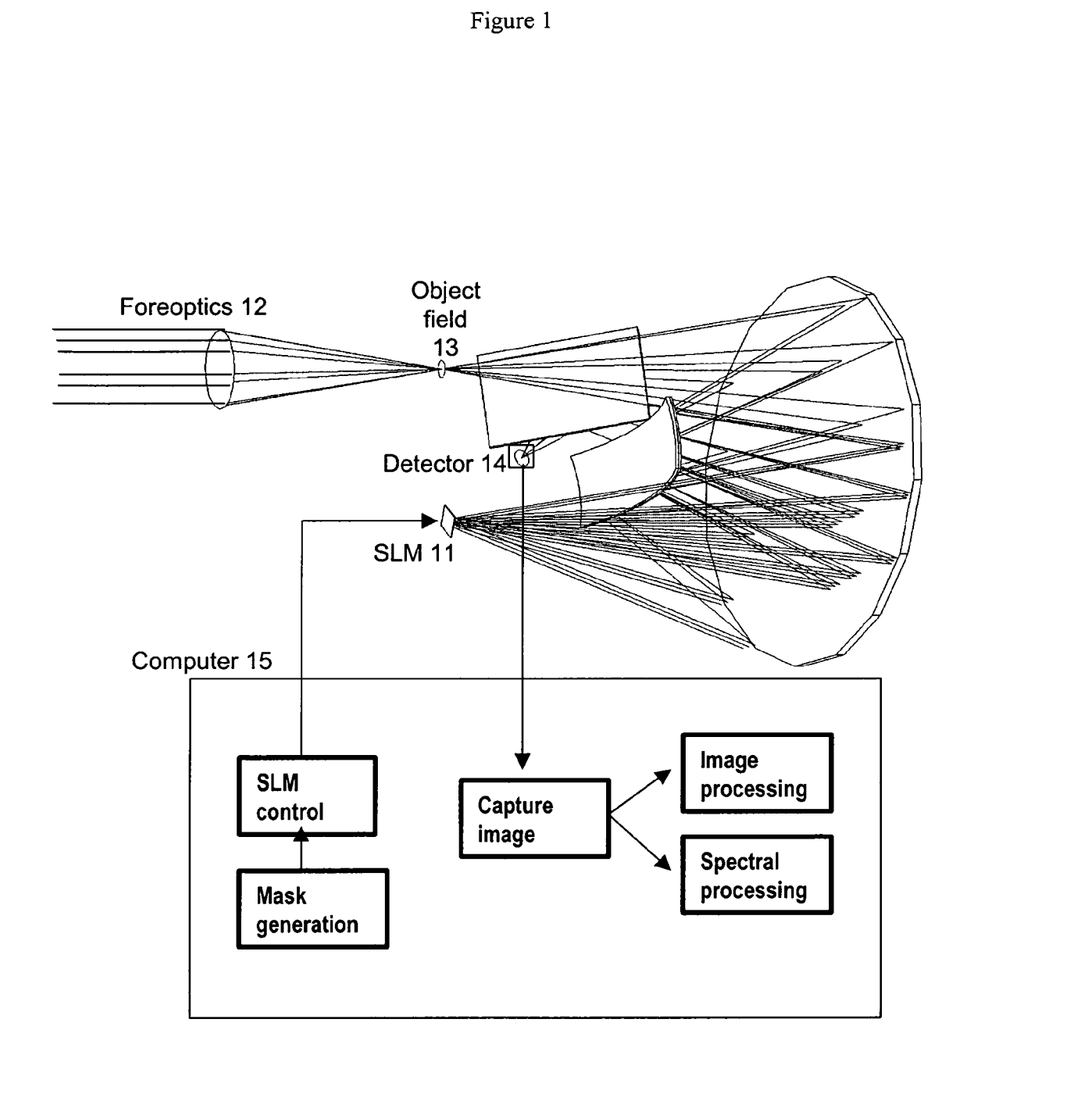
FIG. 1 is a schematic diagram of a preferred embodiment of the spectral encoder of the invention.

FIG. 1 shows one embodiment of a spectral encoder of the invention incorporating a programmable spatial light modulator (SLM) 11 that allows programmable and adaptive selection of the spectral pass bands. It incorporates a telescope foreoptic 12 to deliver an image into its input object field 13. It also uses one or more 2D detector arrays 14 to convert the photons into electrical signals that can be further processed by the encoder's electronics and analyzed by onboard computers 15.

The spectral encoder may provide data for two functions simultaneously, based on the way the output from the detector is processed: one output produces spectrally encoded polychromatic images at the maximum frame rate of the detector, which may be used for object identification, target acquisition, and tracking. The other output, processed simultaneously with the first one, produces spectra of each spatially resolved detector element. The spectra of an array of detector elements can be combined to create hyperspectral images for object discrimination and classification. By applying masking functions with a selected set of parameters to the spatial light modulator, the type of information and spectral and temporal resolution of the data can be adjusted in real time.

The spatial light modulator is preferably a Digital Micromirror Array (DMA), such as those used in digital light projectors. It consists of a two-dimensional array of micromirrors. The DMA may be similar to a Texas Instruments commercially available device, such as that disclosed in U.S. Pat. No. 5,535,047, with 1024×748 individually addressable mirrors on 14 micron centers. The mirrors can be addressed to deflect the light in one of two directions by rotating plus or minus twelve degrees about the diagonal.

Figure 2:
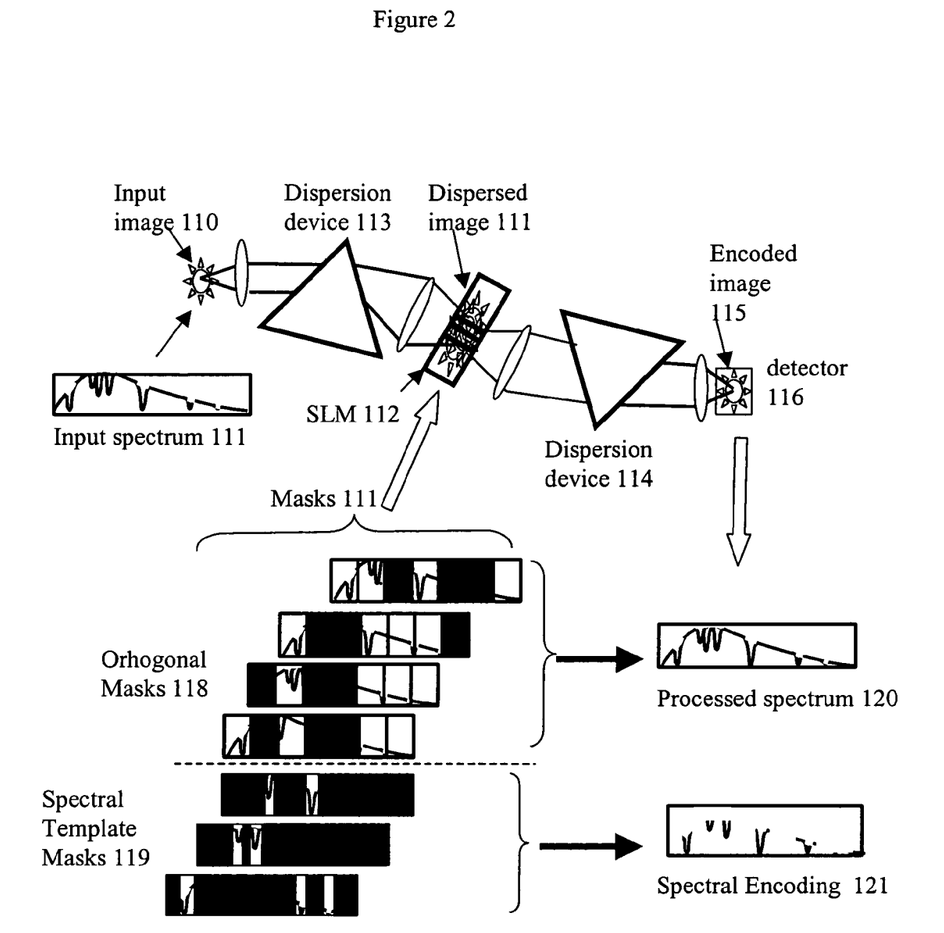
FIG. 2 shows the principles of operation of the invention, along with non-limiting examples of masks that can be applied in the inventive spectral encoder.

The principles of operation of the spectral encoder of the invention are illustrated in FIG. 2. The instrument uses two passes through a spectrograph with an intermediate focus producing a dispersed image 111 on a spatial light modulator (SLM 112). There need not be a physical slit in the system; the system operates as a staring two-dimensional (2D) imaging device. FIG. 2 represents the two passes through the spectrograph as two individual dispersion devices 113 and 114, represented by prisms and lenses. The input image 110, which has spectrum 111 first passes through the spectrograph, which disperses and images all spectral components onto the SLM 112. The SLM spectrally encodes the image by attenuating the intensity of selected spectral bands in the dispersed image. The encoded image is spectrally recombined by the second pass though the spectrograph and imaged onto a 2D focal plane array (FPA) photo detector 116.

Spectral encoding can be achieved by transmission, rejection, or intensity modulation of particular wavelengths. A 2D array SLM whose pixels are individually addressable (and small relative to the resolution element) can be programmed to generate a dynamic series of spatial masks 111 that implement a variety of transform functions. Spectral transform functions include traditional single-slit wavelength scanning, simple multiple-slit filtering, multiplexed Hadamard transform spectroscopy using a sequence of orthogonal mask 118, and application of a spectral template mask 119 that match known distinctive spectral features of the target. The output data might include a processed spectrum 120 of an individual detector element, or images containing spectral encoding 121 as determined by one or more spectral template masks. The spectral template masks might implement a matched-filter designed to detect a single component in the scene, or a multivariate regression vector for a specific spectral component. In this way, the optical processing by the SLM becomes equivalent to numerically projecting the input spectrum onto the spectral component chosen by the SLM mask. The detector signal then becomes the "score" of the measured spectrum relative to a selected spectral component. A number of spectral components can be investigated in quick succession, by cycling their respective multivariate regression vector masks over the SLM.

Figure 3:
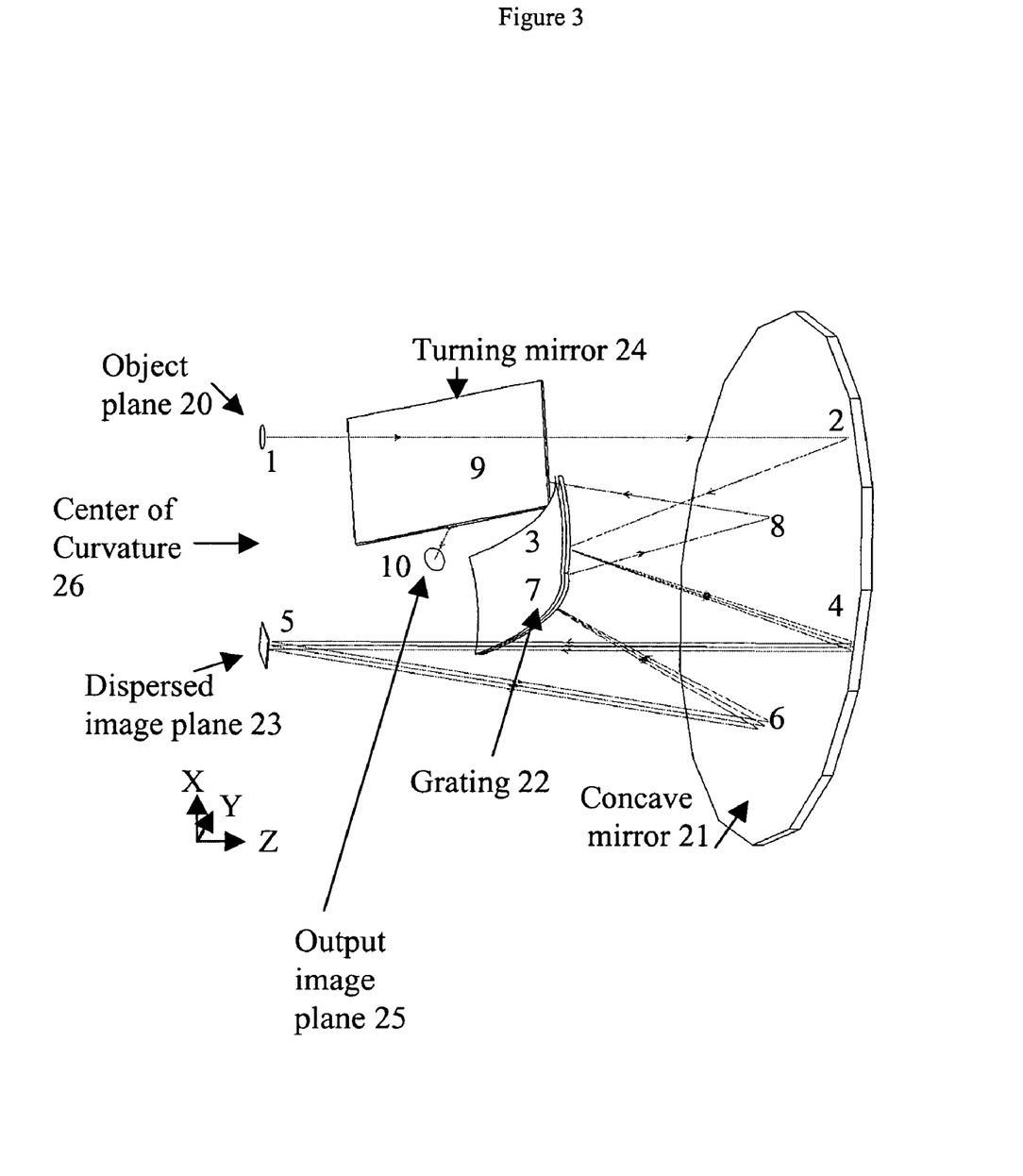
FIG. 3 is a model of the optics and optical paths for the preferred embodiment of the invention.
Figure 4A:
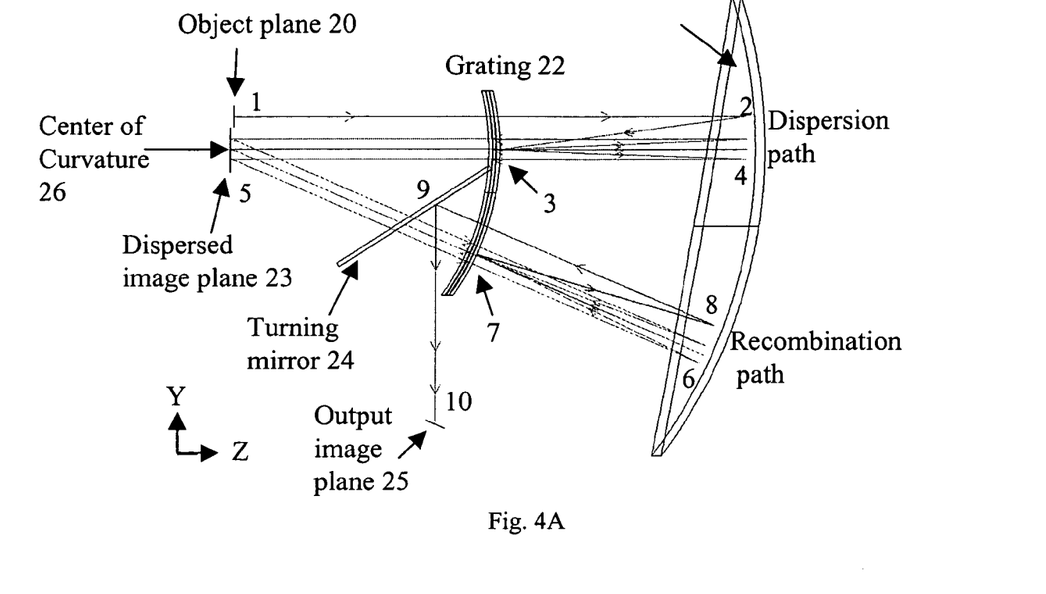
FIGS. 4A and 4B are plane views, in the YZ and XZ planes, respectively, of the optics and optical paths shown in FIG. 3.
Figure 4B:
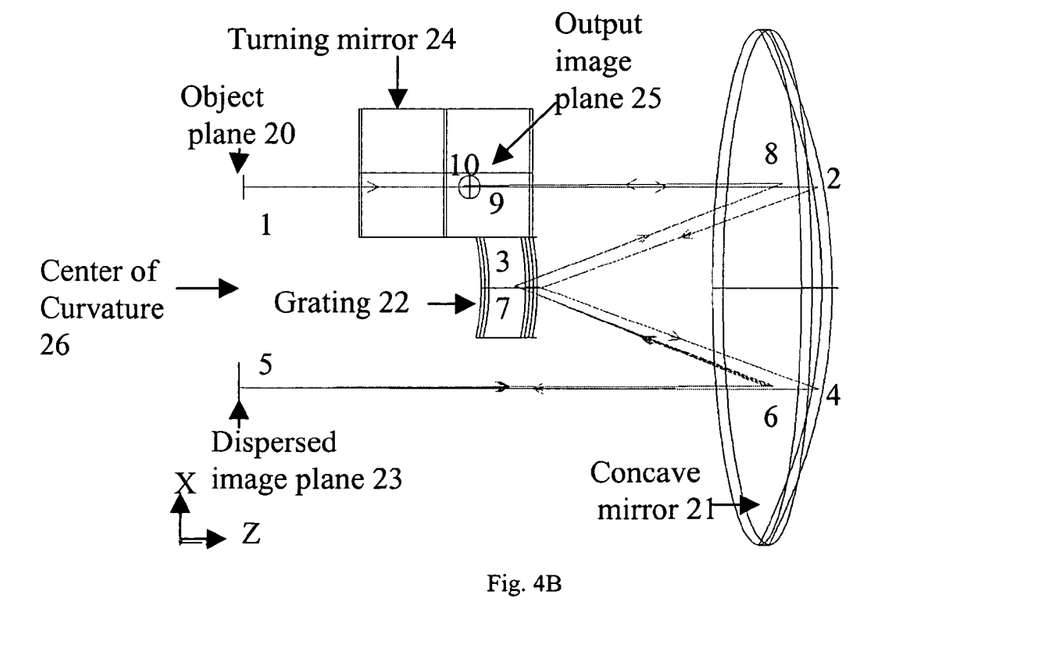

FIGS. 3 and 4 show the preferred embodiment of the dual pass spectrograph for the invention, which is based on a concentric spectrograph of the vertical Offner relay type. FIG. 3 is a solid frame model, while FIGS. 4A and 4B are plane views. The spectrograph is defined by the grating 22 and the spherical mirror 21. The input (or object plane 20) of the spectrograph, and the intermediate dispersed image plane 23 of the spectrograph, are displaced from the center of curvature 26 along the X axis (the vertical axis in FIG. 4B), and the light is dispersed along the Y axis (the vertical axis in FIG. 4A). The light makes two complete passes through the spectrograph, once to disperse the light, and once to recombine the light. Light entering the spectrograph at the object plane passes through the spectrograph to form a dispersed image on the DMA. The DMA reflects the input light in the YZ plane (FIG. 4A) at an angle of twice the mirror deflection angle, and passes it back through the spectrograph, which recombines the various wavelengths. A turning mirror 24 picks off the returning light and forms a recombined image 25 on the detector. Without the turning mirror, the recombined image would overlap the input image in the object plane.

The path through the spectrograph is depicted in detail in FIGS. 3 and 4, which show the path of the chief ray of light leaving a point at the origin of the object field. The chief ray is the center of a cone-shaped beam with a large F number originating from a point in object plane 20. Light entering the spectrograph at point 1 is directed along a first path towards an area around spot 2 on concave mirror 21, then to an area around spot 3 on convex grating 22. Grating 22 disperses the light, and directs the dispersed light to an area centered around location 4 on concave mirror 21. The dispersed light is represented by three lines that correspond to the chief rays for the central and extreme wavelengths of the input light. The light leaving the convex grating is focused onto the dispersed image plane: the maximum wavelength is focused closest to the input point in the YZ plane, while the minimum wavelength is focused farthest from the input point. The light is deflected to an area around spot 6 on concave mirror 21, and back to convex grating 22, which recombines the light and directs it to an area around spot 8 on concave mirror, 21. The light is focused and directed back towards the object plane, but is intercepted by turning mirror 24, and directed to a detector at the output image plane, 25.

This embodiment of the inventive spectrograph design is based on the Offner relay. In the classic Offner relay, the mirror and grating are concentric, and the radius of curvature of the mirror is twice that of the grating. The centers of curvature are in a common plane with the object plane and the image plane. For a system with no dispersion, such a configuration gives very good image quality with no third or fifth order image aberrations. In an Offner spectrograph, the diffraction of the grating breaks the symmetry of the system and introduces additional aberrations. In order to minimize such aberrations, the Offner spectrograph will have small displacements of the centers of curvature from the coplanar configuration, and may have small changes in the radius of curvature, but the device remains nearly concentric, and with a mirror radius of curvature nearly twice that of the grating.

Figure 5A:
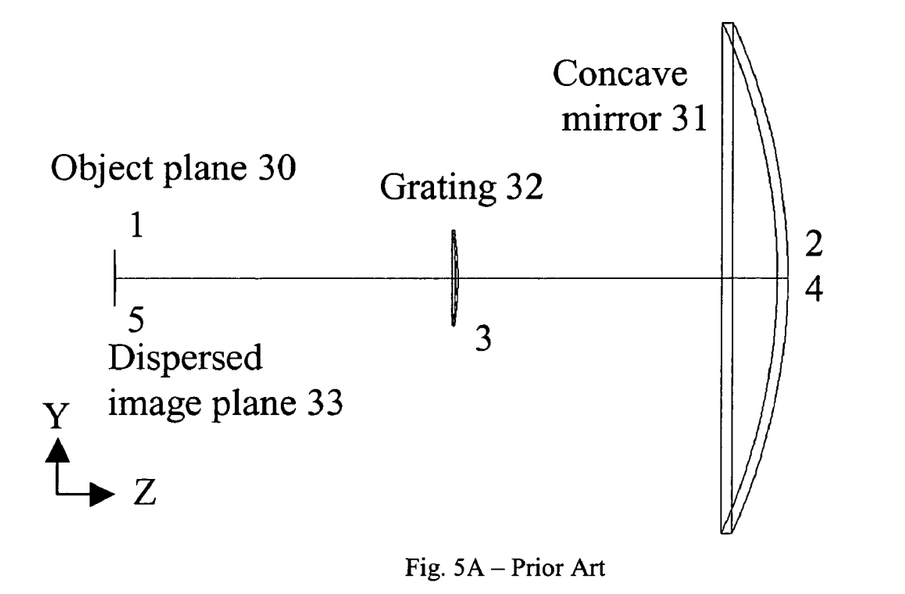
FIGS. 5A and 5B are plane views, in the YZ and XZ planes, respectively, of a prior-art lateral Offner-type spectrograph.
Figure 5B:
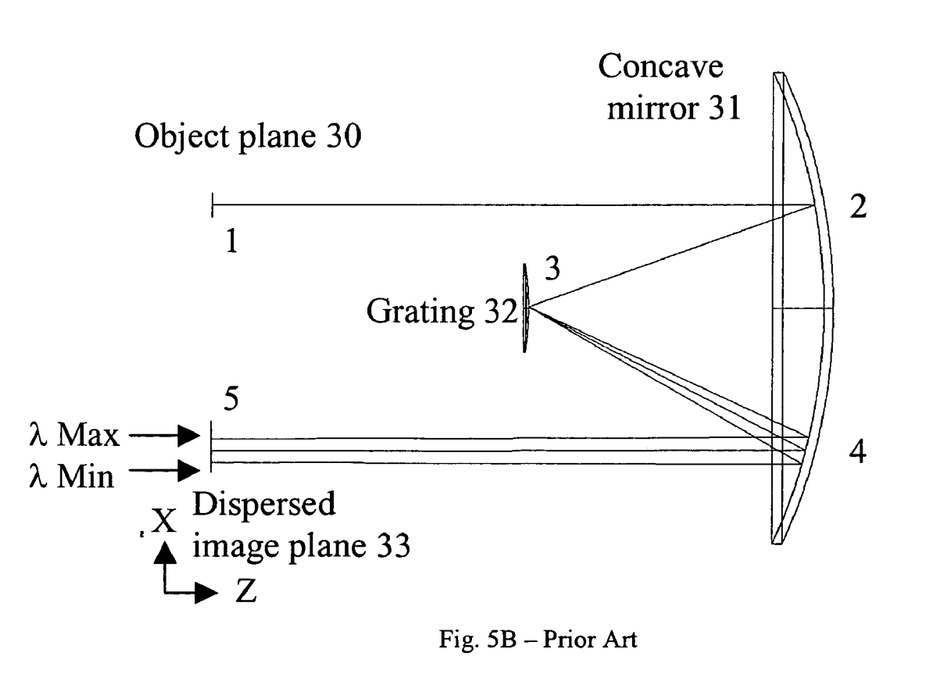
Figure 6A:
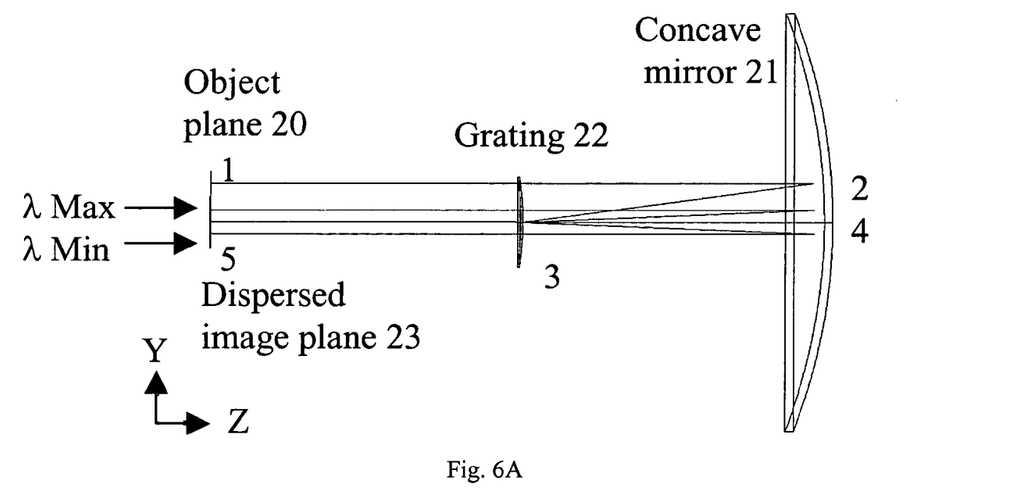
FIGS. 6A and 6B are plane views, in the YZ and XZ planes, respectively, of the reflective and dispersive optics and optical paths for the invention, illustrating the vertical Offner approach utilized in the preferred embodiment of the invention.
Figure 6B:
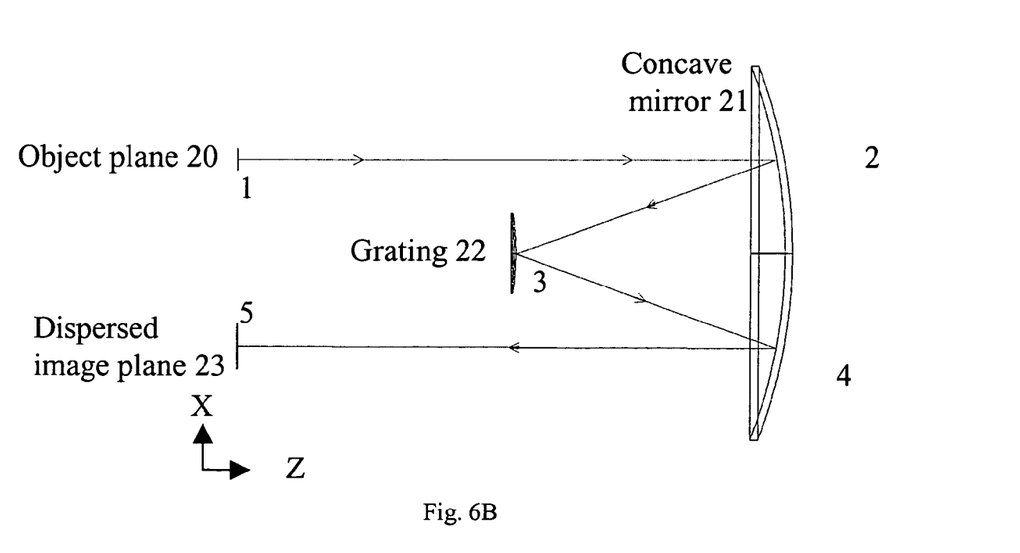

FIGS. 5 and 6 compare the vertical configuration of this embodiment of the invention to the lateral configuration typically used in one-dimensional hyperspectral imagers. In a typical Offner spectrograph of the lateral configuration, shown in FIG. 5, light is dispersed in the same direction as the displacement of the input image 30 and output image 33 along the X axis. The grooves of grating 32 and input slit 37 are aligned along the Y axis. The slit is centered near the radius of curvature of mirror 32 and grating 33 in the Y direction, resulting in very good image quality along the slit dimension. The optical quality degrades rapidly for any image displacement along the X axis.

In the preferred embodiment of this invention, the vertical configuration of FIG. 6 is used. FIG. 6 shows the first path through the preferred embodiment spectrograph of FIG. 4, and has the same numbered elements. Light is dispersed along the X axis, which is perpendicular to the image displacement. The grooves of grating 22 are aligned along the Y axis. The dispersed image 23 falls near the radius of curvature along the Y axis. This results in superior image quality along the dispersion direction (Y axis). Along the X axis there is no dispersion and symmetry is maintained, resulting in the same high image quality as the standard Offner relay with no dispersion.

The improved imaging performance of the vertical Offner configuration relative to the lateral configuration comes from the proximity of the dispersed image to the origin in the dispersion direction. The origin, defined by the intersection of the dispersed image plane with the line connecting the radii of curvature, is an aplanatic focus of the system; i.e. there is no spherical aberration at that point. Third and fifth order paraxial aberrations, such as spherical aberration and coma, are minimized by keeping the image close to the origin. The remaining astigmatism can be minimized by a slight displacement of the radii of curvature of the grating and mirror.

The illustrated non-limiting implementation of FIGS. 3 and 4 uses just two spherical surfaces and one plane mirror. The outer mirror has a diameter of D=180 mm and a radius of curvature of R=200 mm. The inner grating is a 19×45 mm rectangular, with R=100 mm. The displacement along the Z axis of the centers of curvature of the grating and mirror from the object plane are 2 and 1 mm, respectively. The object field is a 6×8 mm rectangle. The DMD is a 10×15 mm rectangle rotated at 45° about the Z axis. The wavelength range is 7-13 microns, with a linear dispersion of 1.2 mm/micron at the DMA. The system has an effective F number of 1/f=2.8. The geometric spot sizes are less than $r_{rms}$=20 microns throughout the image plane. This is less than the diffraction-limited spot size for this spectral range.

Other implementations of the vertical Offner design used in the preferred embodiment of the invention are possible. Different size optics and different wavelength ranges may be used. The concave mirror can be made of two or four separate elements, which may or may not share the same center of curvature. The grating might be two separate surfaces. Non-spherical surfaces can be used to provide enhanced image quality.

Alternative implementations of concentric spectrographs may also be used in the invention. These can include systems with all transmissive optics, and systems that use a combination of transmissive and reflective elements. One such system would be a spectrograph of the Dyson relay type, which uses a plano-concave transmissive element in conjunction with a nearly concentric convex grating.

An alternative embodiment of the double pass spectrograph for the preferred embodiment of the invention uses a simpler optical design consisting of a single concave grating and additional turning mirrors. This design has somewhat worse spatial resolution than the first embodiment, but is simpler, smaller, and lighter, which makes it useful for applications that are less sensitive to the ultimate spatial resolution. It is especially attractive for applications where the spectral encoder might be used as a spectrograph, with limited or no spatial resolution.

Figure 7A:
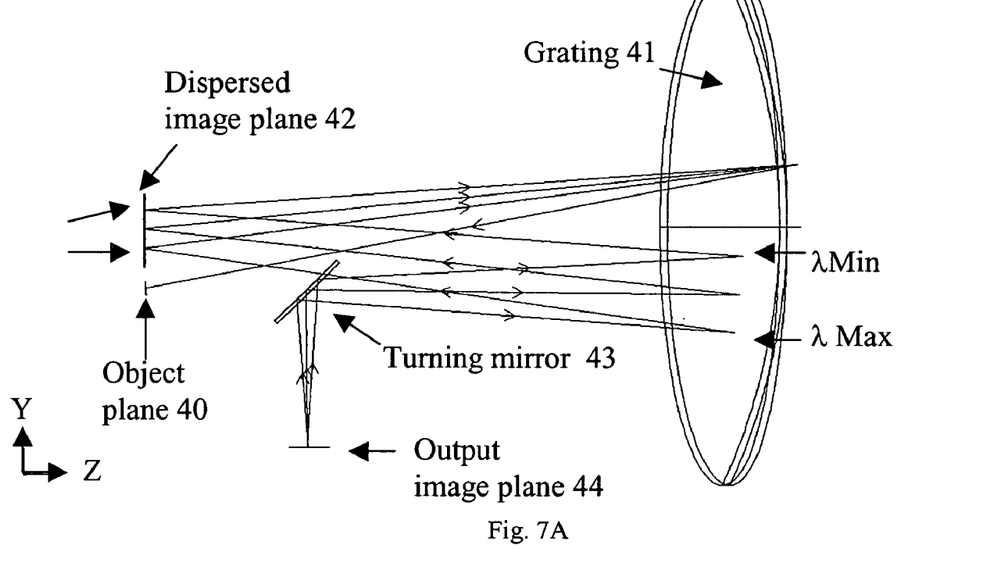
FIGS. 7A and 7B are views similar to that of FIGS. 4A and 4B for an alternative embodiment of the optics that uses a single concave grating.
Figure 7B:
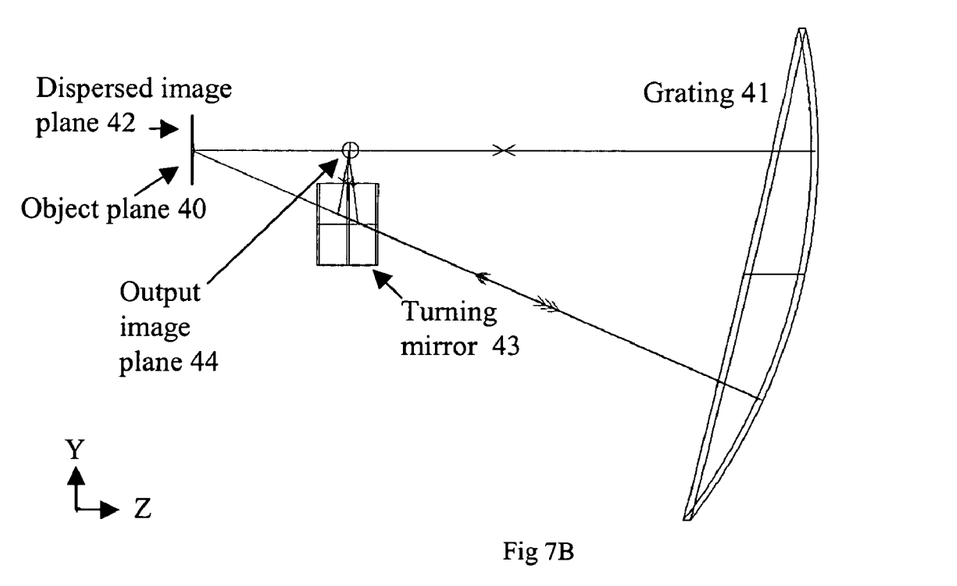

FIGS. 7A and 7B show two plane views of such a system in the YZ and XZ axes, respectively. The dispersed image is placed near the origin, as defined by the center of curvature of a single concave grating. Light enters at an off-axis point in the object plane 40, and is directed to the concave grating 41, which forms a dispersed image 42 on the DMA. The image is dispersed along the Y axis. The DMA redirects the light though the spectrograph, with the second pass separated from the first path in the XZ plane by twice the mirror deflection angle. The light is intercepted by turning mirror 43 and focused on the output image plane, 44. In this example, the concave grating is toroidal with radii of curvature of $R_1$=150 mm and $R_2$=149.3 mm. The object field is a 3×3 mm rectangle. The DMD is a 10×15 mm rectangle rotated at 45° about the Z axis. The wavelength range is 7-13 microns, with a groove passing of 10/mm. The system has an effective F number of 1/f=2.8. The geometric spot size is substantially larger than that for the vertical Offner configuration, but is still similar to the diffraction limit at this wavelength. The geometric spot sizes range from $r_{rms}$=20 microns at the origin, to $r_{rms}$=40 microns at the edge of the field. This provides a spatial resolution of about 75×75 pixels within the field of view, which is more than adequate for many applications.

Similar performance can be obtained using a spherical grating and a cylindrical correction optic, such as a cylindrical turning mirror. Different size optics may be used.

ALTERNATIVE EMBODIMENTS

Figure 8:
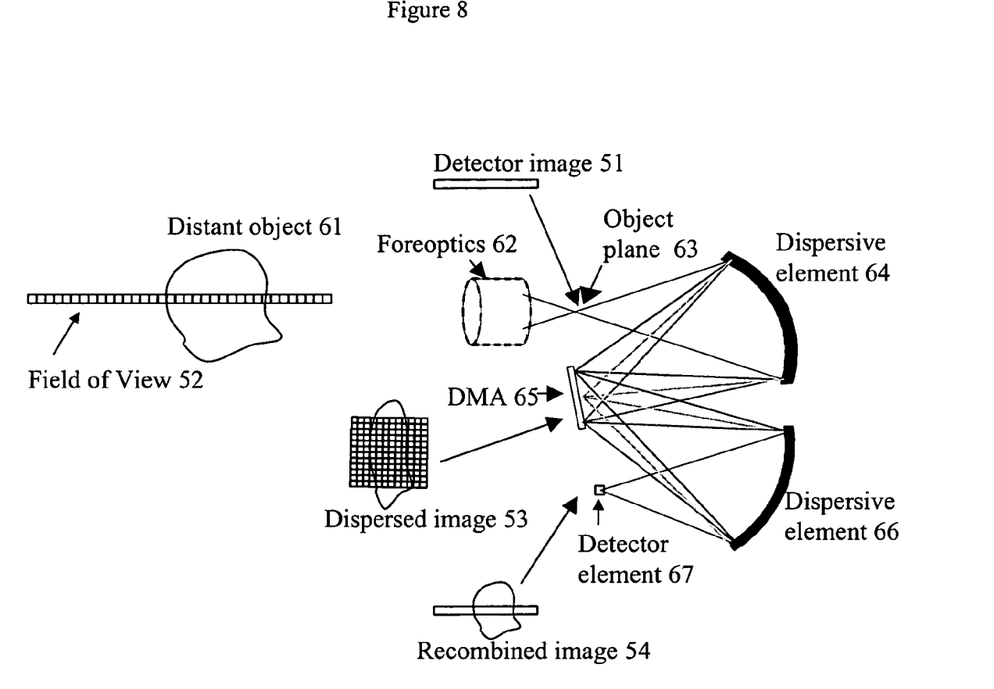
FIG. 8 depicts another alternative embodiment with a single element detector.

The dual pass spectrograph of this invention may be used in conjunction with array detectors or with single element detectors. The embodiment of FIG. 1 shows an implementation with a two dimensional detector where each detector element defines a spatial domain in the field of view, and in conjunction with the spectral mask, a spectral pass band. In a similar fashion, the elements of a one-dimensional array, or a single-element detector, also define a spatial and spectral domain, as shown in FIG. 8. FIG. 8 also shows how the spatial mask can be used to define both the spectral bandpass and provide additional spatial resolution, beyond that obtained by the detector element alone. FIG. 8 shows as an example a spectral imager incorporating a foreoptic and the spectral encoder of the invention. The spectral encoder contains a dual pass spectrograph, and a single, elongated detector element in the recombined image plane. In the figure the dual pass spectrograph is represented by two separate concave gratings, but it might also be a single spectrograph with two optical paths, such as those shown in FIG. 3 and FIG. 7. In the figure, light from the distant object 61 is collected by foreoptics 62, and focused on the spectrograph object plane 63. The light is collimated and dispersed by dispersive element 64, and focused onto DMA 65. The DMA selects spatial and spectral elements of the scene and directs them at an angle towards dispersive element 66, which focuses the light onto detector element 67.

The detector element has a virtual image 51 at the spectrograph object plane 63, and a second virtual image in the field of view 52, at the focus of the foreoptic on distant object 61. Virtual image 52 defines the field of view of the system. The field of view is imaged at the object plane of the spectrograph 63, and then forms a dispersed image 53 on the DMA 65. The DMA mirrors, acting in conjunction with the detector element, can be programmed to address specific spectral and spatial components of the image. Selecting a column of mirrors along the dispersion axis selects a spectral pass band. Selecting a row of mirrors along the perpendicular direction selects for a spatial location along the long axis of the field of view. The virtual image 52, of the DMA rows on the distant object 61 defines the spatially resolved elements of the field of view.

A spatially and/or spectrally resolved image can be obtained by a series of measurements, each with different spatial and spectral encoding of the pass band. The images can then be formed by combining the various measurements. The series of measurements can be made in a time series using a programmable spatial mask, or may be made in parallel using a number of detectors, each with a different spatial mask.

Thus in the embodiment shown in FIG. 8, a single element detector is used in conjunction with a time series of measurements and a programmable spatial light modulator to make spatially and spectrally encoded images. Any sequence of spectral and spatial masking operations can be programmed into the system. The system may change the sequence of masks used depending on the application, or based on the results of previous measurements. The mask sequence could be a simple scanning sequence, or may use common multiplexing approaches such as Hadamard simplexes. The multiplexing can be either in the spectral or spatial dimension, or may be done simultaneously in both domains. A single spectral mask can be used with a series of spatial masks to produce a one dimensional image with a very specific spectral pass band that matches the spectral template of a material of interest. Alternatively, a series of spectral and spatial masks can be used to make maps of multiple materials. Finally, a full spectrum can be recorded, using a series of masks that includes a complete spectral range.

The spectral masks may form spectral templates that emphasize specific aspects of the known spectral content of a scene. These spectral templates may be designed to have a physical meaning by closely emulating the identifiable spectral components of objects within the scene, or a specific linear combination of spectral components within the scene. The spectral components can include characteristics of hard objects in the scene, or the gases along the optical path from the imager to a distant target, for example. The spectral template may be designed to match the spectra of specific materials or chemicals, or it may be designed to de-emphasize other materials and chemicals that are considered to be background clutter, such as atmospheric gas spectra or spectra of common materials. The mask may be designed to emphasize one target spectral feature while simultaneously suppressing a second background feature.

The masks may be designed to implement detection algorithms in hardware, for example by implementing a spectral matched filter, projection operations, or other common detection and identification algorithms.

A matched filter is a well-known technique for identifying a known spectral component in a scene with a variable spectral background. The matched filter is a linear filter vector, i.e. a spectrum, whose dot product with the measured spectrum produces a value representing the strength of the target features present in the measured spectrum. The matched filter for a target object within a scene is the spectrum that gives the smallest rms value when applied to a scene that does not contain the target. Thus the matched filter is the best linear filter, in the least square sense, for detecting a target in the scene. A matched filter can be constructed from two spectral templates, one representing the portion of the matched filter spectrum with positive values, and one representing the portion of the matched filter with negative values. The strength may be determined by making measurements in rapid succession with each of the spectral templates, and subtracting the two measurements. Alternatively, two or more detector elements that each view the same portion of the input radiation field can be encoded with different spectral templates, thereby simultaneously recording both spectral templates required for the matched filter.

Spectral templates can also be designed for use in determining the spectral composition of a scene by projection methods. In projection methods, a set of orthogonal spectral basis functions are created and used to represent the spectrum. The contribution of each spectral basis to a scene is determined by the dot product of the spectral basis with the observed spectrum, or the projection of the observed spectrum onto the spectral basis. If a spectral template represents a member of an orthogonal spectral basis, the measured instantaneous intensity is equivalent to the projection and is thus a measure of the contribution of the spectral basis member to the observed spectrum. Thus a measurement using the spectral template is equivalent to determining the contribution of the spectral basis member to the scene. Any number of methods can be used to produce orthogonal spectral basis members with physical meaning. These include principal components analysis and end-member analysis.

FIG. 8 shows an embodiment with only a single element detector, but other embodiments would use a one dimensional or two dimensional focal plane array to measure multiple elements of the field of view. For example, the preferred embodiment of FIG. 1 uses a two-dimensional array to measure a spatially resolved image. Each element of that array works in conjunction with the spatial mask to define a spectral template, which is encoded into the image.

In an alternative embodiment, a one dimensional array may replace the single element detector in FIG. 8. The one-dimensional array would be oriented along the long axis of the detector and perpendicular to the dispersion axis, with each detector element looking at a different part of the input radiation field. This allows the simultaneous recording of data in all of the spatial elements within the field of view. This capacity is very useful for monitoring dynamic behavior within a system. For example, in one implementation for combustion monitoring, fiber optic means are used to introduce radiation to multiple locations in the object plane. The input fibers are imaged onto a one dimensional array, with each fiber illuminating one or more elements of the array. Each element of the array is encoded with a spectral mask set to emphasize a specific molecular combustion product, such as water, carbon monoxide, or a transient species such as the hydroxyl radical. In this way, dynamic data from each of the spatial locations is recorded simultaneously at different detector elements.

All elements can share a common spectral mask, corresponding to a specific combustion product, or different detector elements can monitor different spectral components. Different spectral components can be monitored using a collection of data collected with different spectral templates. The collection can be obtained either by time sequence, or by simultaneous monitoring of the same source fiber with multiple detector elements, each corresponding to a different spectral template.

Although specific features of the invention are shown in some drawings and not others, this is for convenience only as some feature may be combined with any or all of the other features in accordance with the invention.

Other embodiments will occur to those skilled in the art and are within the following claims.

What is claimed is:

1. A spectral encoder for producing spectrally selected images of a radiation field containing multiple spectral components, comprising:
   an imaging spectrograph that defines a first optical path that produces from the input radiation field a spectrally dispersed image comprising multiple spectral components displaced along a dispersion direction;
   means, comprising a spatial light modulator, for encoding spectral pass bands on the dispersed image using one or more spatial masks;
   the imaging spectrograph further defining a second optical path that reverses the spectral dispersion of the first path and produces a spectrally-encoded polychromatic output image containing spectral components as encoded by the spatial mask;
   wherein the first and second optical paths share a common dispersing element; and
   a detector that records at least one spatial region of the spectrally encoded output image.

2. The spectral encoder of claim 1 in which the spatial light modulator comprises a two-dimensional digital micromirror array.

3. The spectral encoder of claim 1 in which the dispersing element is a curved grating.

4. The spectral encoder of claim 3 in which the imaging spectrograph in the first optical path places the dispersed image near to center of curvature of the grating along the dispersion direction, to reduce image aberrations.

5. The spectral encoder of claim 1 in which the imaging spectrograph in the first optical path places the dispersed image near the aplanatic focus along the dispersion direction, to reduce image aberrations.

6. The spectral encoder of claim 1 in which the spectrograph comprises a near-concentric optical system defined by a curved grating and at least one additional curved refractive or reflective element, in which the input image, dispersed image, and the center of curvature of both the grating and the refractive or reflective element are nearly coplanar.

7. The spectral encoder of claim 6 in which the near-concentric optical system comprises a convex and near-spherical grating, and at least one concave and near-spherical mirror with a radius of curvature approximately twice that of the grating.

8. The spectral encoder of claim 7 in which the input image is offset from the center of curvature of the grating in a direction perpendicular to the dispersion direction by a distance that is greater than the displacement along the dispersion direction.

9. The spectral encoder of claim 8 in which the center of curvature of the convex grating and concave mirror are displaced from one another by a small distance to correct image aberrations.

10. The spectral encoder of claim 1 in which the detector is a two-dimensional array detector.

11. The spectral encoder of claim 1 in which the detector is a one-dimensional array detector.

12. The spectral encoder of claim 1 in which the detector is a single element detector.

13. The spectral encoder of claim 1 in which the spatial light modulator is used to encode spatial as well as spectral information within the image.

14. The spectral encoder of claim 1 in which the combination of the detector and the spatial masks define the spectral pass bands of the imager.

15. The spectral encoder of claim 1 in which a collection of images each with a different instantaneous set of spectral pass bands are detected and processed to develop spectra of spatially resolved elements of the image.

16. The spectral encoder of claim 1 in which the means for encoding further comprises a spectral template containing multiple spectral pass bands.

17. The spectral encoder of claim 16 in which the multiple spectral pass bands of the spectral template are designed to identify a spectral feature, or combinations of spectral features, that are characteristic of a specific object, liquid, gas, or scene condition.

18. The spectral encoder of claim 17 in which an image is generated of the radiation that conforms to the specific spectral template within the field of view.

19. The spectral encoder of claim 17 further comprising a hardware implementation of a projection operator for determining the contribution to the observed spectrum of one member of an orthogonal set of spectral templates representing known spectral signatures or linear combinations of known spectral signatures.

20. The spectral encoder of claim 1 in which a collection of images with different specific spectral templates are generated and processed to detect, identify, or quantify specific objects, liquids, gases, or scene conditions.

21. The spectral encoder of claim 20 further comprising a hardware implementation of a matched filter, for accomplishing the generation and processing of the collection of images.

22. The spectral encoder of claim 20 further comprising a hardware implementation of an orthogonal set of spectral templates representing known spectral signatures or linear combinations of known spectral signatures, for accomplishing the generation and processing of the collection of images.

23. A spectral encoder for producing spectrally selected images of a radiation field containing multiple spectral components, comprising:
   a first spectrograph means that forms a dispersed image comprising multiple spectral components displaced along a dispersion direction;
   means, comprising a spatial light modulator, for encoding spectral pass bands on the dispersed image;
   means for redirecting the dispersed image through a second spectrograph means to recombine the selected spectral components into a spectrally encoded two-dimensional image;
   a detector that records at least one spatially resolved element of the spectrally encoded image;

wherein each spectrograph means comprises a near-concentric optical system defined by a convex dispersive element and at least one concave mirror;

wherein the input image, dispersed image, and the center of curvature of the curved optical surfaces are nearly coplanar, and the light path through the spectrograph means originates in the object plane, proceeds along a first path to a first location on the concave mirror, along a second path to the convex dispersive element, along a third path to a second location on the concave mirror, and along a fourth path back to the image plane; and wherein the dispersive element is oriented so that the dispersed images are placed near the dispersive element center of curvature along the dispersion direction, and substantially offset from the dispersive element center of curvature in the direction perpendicular to the dispersion direction.

24. The spectral encoder of claim 23 in which the spatial light modulator comprises a digital micromirror array.

25. The spectral encoder of claim 23 in which the first and second spectrograph means comprise a single spectrograph with a common convex dispersive element.

26. The spectral encoder of claim 23 comprising two separate concave mirrors, one at the first location and one at the second location.

27. The spectral encoder of claim 23 in which the detector is an array detector with multiple elements.

28. The spectral encoder of claim 23 in which the detector is a single element detector.

29. The spectral encoder of claim 23 in which the spatial light modulator is used to distinguish different spatial regions within the image.

30. The spectral encoder of claim 23 in which the means for encoding further comprises a spatial mask, which in conjunction with the detector elements, or an optional input slit, defines a specific spectral template with defined spectral components.

31. The spectral encoder of claim 30 in which a collection of images with different spectral templates are detected and processed to develop spectra of at least one spatially resolved element of the image.

32. The spectral encoder of claim 30 in which the specific template is designed to emphasize a spectral feature or combinations of spectral features characteristic of a specific object, liquid, gas, or scene condition.

33. The spectral encoder of claim 32 further comprising a hardware implementation of a projection operator for determining the contribution to the observed spectrum of one member of an orthogonal set of spectral templates representing known spectral signatures or linear combinations of known spectral signatures.

34. The spectral encoder of claim 30 in which a collection of images with different specific spectral templates are generated and processed to detect, identify, or quantify specific objects, liquids, gases, or scene conditions.

35. The spectral encoder of claim 34 further comprising a hardware implementation of a matched filter, for accomplishing the generation and processing of the collection of images.

36. The spectral encoder of claim 34 further comprising a hardware implementation of an orthogonal set of spectral templates representing known spectral signatures or linear combinations of known spectral signatures, for accomplishing the generation and processing of the collection of images.

37. A spectral encoder for producing spectrally processed images of a radiation field containing multiple spectral components, comprising:

a first spectrograph means that forms a dispersed image comprising multiple spectral components displaced along a dispersion direction;

means for encoding selected spectral pass bands on the dispersed image using a spatial mask;

means for redirecting the dispersed image through a second spectrograph means to recombine the selected spectral components into a spectrally encoded two-dimensional image;

a detector comprising one or more detector elements that record spatially resolved elements of the image; and wherein each detector element defines a virtual slit, that in combination with the spatial mask defines a specific template of spectral pass bands.

38. The spectral encoder of claim 37 in which the means for encoding comprises a spatial light modulator.

39. The spectral encoder of claim 38 in which the spatial light modulator is used to encode spatial information within the image.

40. The spectral encoder of claim 38 in which spectra of at least one spatially resolved element within the image are developed by detecting and processing a sequence of images, each with a different template of specific spectral pass bands.

41. The spectral encoder of claim 37 in which the detector is a two-dimensional array detector.

42. The spectral encoder of claim 37 in which the detector is a one-dimensional array detector.

43. The spectral encoder of claim 37 in which the detector is a single element detector.

44. The spectral encoder of claim 37 in which a template of spectral pass bands is designed to emphasize a spectral feature or combinations of spectral features characteristic of an object, liquid, gas, or scene condition.

45. The spectral encoder of claim 44 further comprising a hardware implementation of a projection operator for determining the contribution to the observed spectrum of one member of an orthogonal set of spectral templates representing known spectral signatures or linear combinations of known spectral signatures.

46. The spectral encoder of claim 37 in which a collection of images with different templates are generated and processed to detect, identify, or quantify objects, liquids, gases, or scene conditions.

47. The spectral encoder of claim 46 further comprising a hardware implementation of a matched filter, for accomplishing the generation and processing of the collection of images.

48. The spectral encoder of claim 46 further comprising a hardware implementation of an orthogonal set of spectral templates representing known spectral signatures or linear combinations of known spectral signatures, for accomplishing the generation and processing of the collection of images.

* * * * *